June 3, 1930.  E. J. VON HENKE  1,761,458
APPARATUS FOR ELECTRIC WELDING
Filed Dec. 5, 1922  3 Sheets-Sheet 1

Inventor
Edmund J. von Henke
By Gifford Bull & Hull
Attorneys.

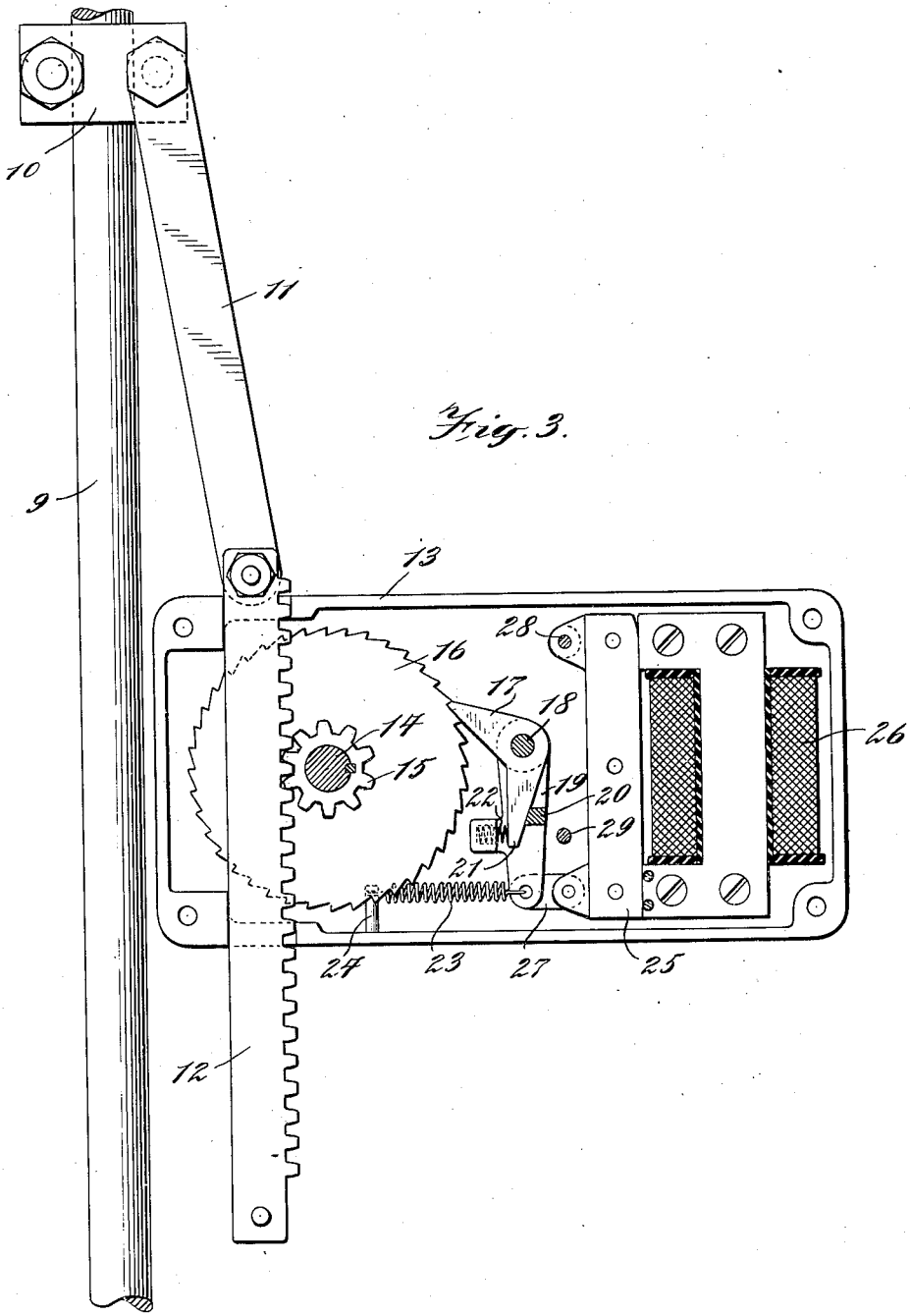

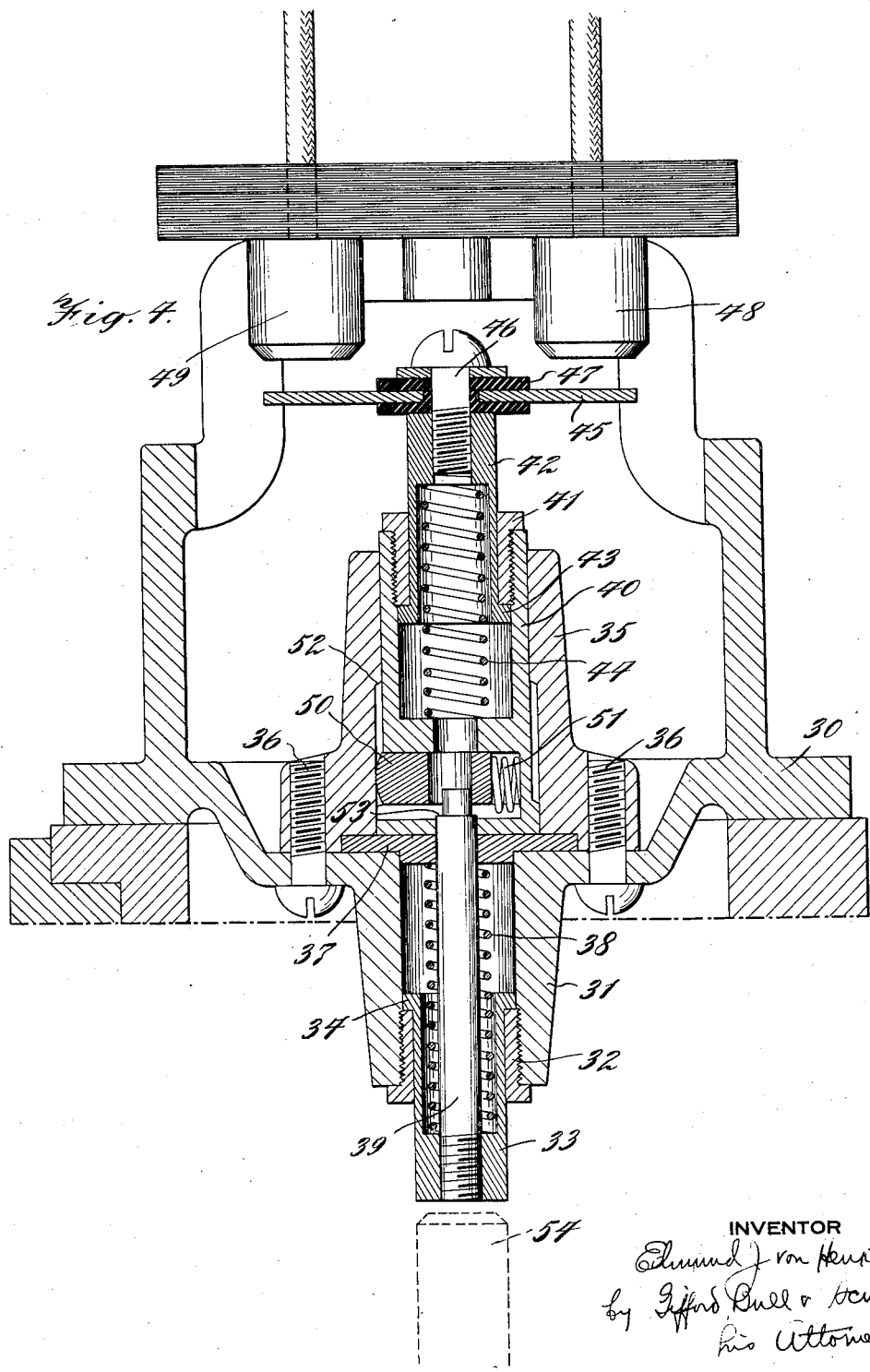

Patented June 3, 1930

1,761,458

UNITED STATES PATENT OFFICE

EDMUND J. von HENKE, OF CHICAGO, ILLINOIS, ASSIGNOR TO AMERICAN ELECTRIC FUSION CORPORATION, OF CHICAGO, ILLINOIS, A CORPORATION OF ILLINOIS

APPARATUS FOR ELECTRIC WELDING

Application filed December 5, 1922. Serial No. 604,976.

My invention is related to welding systems and apparatus and particularly to systems and apparatus for spot welding.

Heretofore in operating a spot welder, a great deal depended upon the human element, that is, the care which the operator exercised in making each weld.

In order to make the welds correctly, the welding cycle consists of the following four distinct periods or operations: The initial compression of the work between the electrodes; the proper heat; the cutting off of the current at the proper instant; and the application of the final pressure to set the weld.

I have devised a system and apparatus which automatically carries out the four steps above-mentioned in the order mentioned and which apparatus may be adjusted to perform the operations mentioned in a predetermined and accurate manner.

By the use of my invention spot welding is so accurately performed that it gives as positive results as rivets, bolts, or any known method of joining metals, and has many advantages over any method known to me.

By the use of my invention the human element is eliminated and the operations performed in such a manner as to guarantee uniform results. My invention will be better understood by reading the following description taken in connection with the accompanying drawings illustrating my system and one form of apparatus for use therein and in which Figure 1 is a side elevation of a welder embodying my invention, certain parts being shown in dotted lines;

Figure 3 is a view of the relay with the cover removed; and

Figure 4 is a sectional view of the automatic switch.

Figure 1:
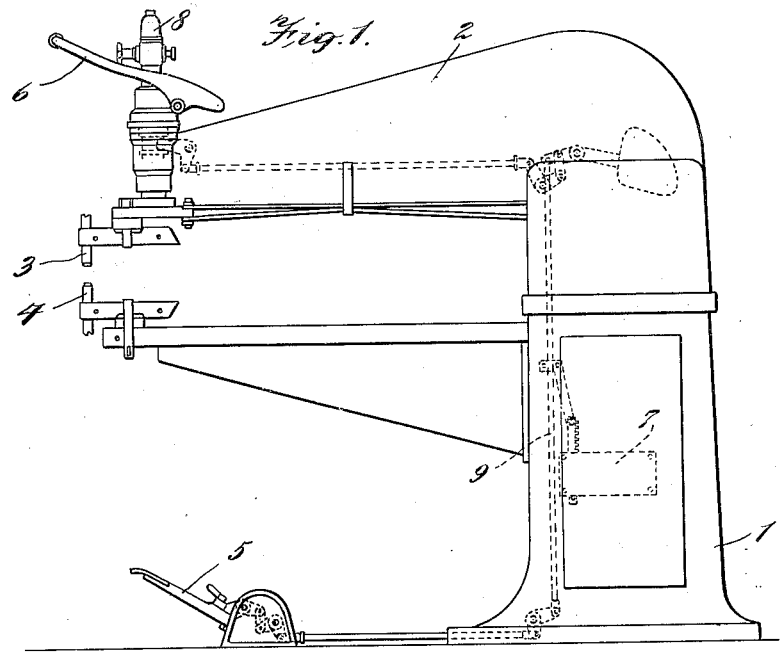

Referring to Fig. 1, the machine consists in part of a casing (1), a head (2), contacts (3) and (4), treadle (5), handle (6), relay (7) and an automatic switch (8).

The treadle (5) is connected through a system of levers, shown in dotted lines in Fig. 1, with the upper contact (3) so that, when the treadle (5) is pushed downwardly, the contact (3) approaches contact (4). The handle (6) is so connected with the contact (3) that, when the handle is moved downwardly, the contact (3) will approach the contact (4). The operator may, therefore, use either the treadle or the handle, or both. When the treadle or handle is moved downwardly, the rod (9) moves downwardly, as will be seen from an inspection of the device shown in Fig. 1.

A portion of the rod (9) is shown in Fig. 3. A member (10) is clamped on to the rod (9) and a link (11) connects the member (10) with a rack (12). The rack (12) passes freely through openings in the sides of a casing (13) of the relay. A shaft (14) is journaled in the casing (13) and carries a pinion (15) which meshes with the teeth on the rack (12). The shaft (14) also carries a ratchet wheel (16) and a pawl (17) is pivoted at (18) and is adapted to engage the ratchet wheel under conditions which will be later explained. A member (19) is also pivoted at (18) and has a lug (20) which engages the end (21) of the pawl.

A spring (22) is placed in a socket in the member (19) and one end of the spring bears against the part (21) of the pawl. The pawl and the member (19) are both free to rotate around the pivot pin (18). A tension spring (23) is connected at one end with the lower end of the member (19) and at the other end to a post (24) mounted on the casing (13). The lower end of the member (19) is also connected to the armature (25) of an electromagnet (26) through a link (27). The armature (25) is pivoted at (28). When the coil (26) is energized the armature (25) takes the position shown in Fig. 3. The pawl and other parts of the relay also assume the positions shown in Fig. 3. When the coil (26) is deenergized, the armature (25) is pulled against the stop (29) by spring (23), the member (19) is rotated in a clockwise direction and the lug (20) rotates the pawl (17) around the pin (18) out of contact with the ratchet wheel (16). Thus when the magnet (26) is de-energized, the pawl is removed from the ratchet and when the magnet is energized, the pawl engages the ratchet.

The automatic switch (8) is shown in detail in Fig. 4. This switch and the device shown in Fig. 1 are shown and described in my Patent No. 1,626,769, dated May 3, 1927, and the function of the switch and the machine shown in Fig. 1 are fully set forth in said patent. The switch shown in Fig. 4 comprises a frame member (30) having a depending portion (31) into which is screwed a bushing (32), a sleeve (33) is placed inside the bushing (31), and is provided with a head (34) to limit the downward movement thereof. A member (35) is fastened to the frame (30) by screws (36). A member (37) is clamped between the members (35) and (31). One end of a spring (38) engages member (37) and the other end engages a shoulder on the sleeve (34). A rod (39) is screwed into the sleeve (34) and extends upward through the member (37). A cylindrical member (40) fits into an opening in the member (35) and a bushing (41) is screwed into the member (40). A sleeve (42) is placed inside the bushing (41) and has a head (43) which limits the upward movement thereof in the bushing (41). The member (40) is cup-shaped and is provided with an opening in its bottom part. One end of a spring (44) engages the bottom of the cup member (40) and the other end engages a shoulder on the bushing (42). The upper end of the bushing (42) carries a contact (45), held in place by a screw (46). The contact (45) is insulated from the screw and the bushing by insulating material (47).

Figure 2:
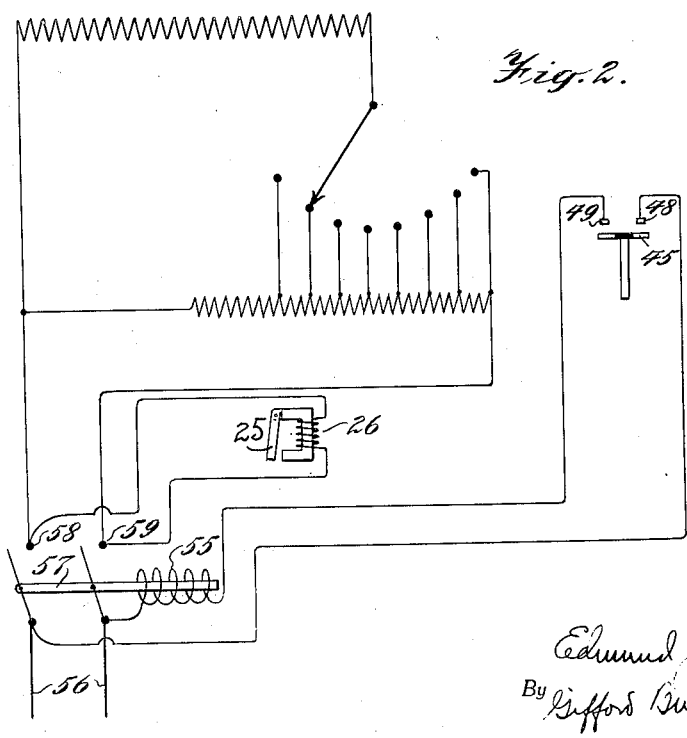
Figure 2 is a diagrammatic illustration of a part of the welding circuit.

The contact member (45) is adapted to connect the fixed contacts (48) and (49) together. Placed in the lower portion of the member (40) is a cam (50). This member is normally held in the position shown by a spring (51). The interior of the member (35) is provided with a cam surface (52) which is engaged by the end of the member (50) which is then pushed to the right as it is moved upwardly. The upper end of the rod (39) is reduced in diameter so as to form a shoulder (53) which engages the lower side of the member (50) and pushes that member together with the member (40) upwardly. Member (54) (corresponding to member 73 in Fig. 2 of my said Patent 1,626,769) shown in dotted lines in Fig. 4 is connected so as to operate the switch (8) so that when the contact (3) is moved into contact with the work, the contact (45) connects the terminals (48) and (49) together, thus closing a circuit through the magnet (55) from the line (56) (see Fig. 2), whereupon the switch (57) connects the points (58) and (59) across the line (56). The member 54 is mounted in the end of the head 2 and is operated by the treadle 5 as well as the handle 6 so that upon pressing down either the treadle 5 or handle 6 the parts operate as above described. This energizes the coil (26) which pulls its armature (25) into the position shown in Fig. 3. Since the ratchet wheel (16) is connected with the rod (9) through the means heretofore explained, it is impossible for the operator to raise the electrode (3) away from the work. The conditions above explained obtain until the circuit through the magnet (26) is interrupted. This circuit is controlled by the automatic switch (8), as follows: As the member (54) pushes the rod (39) upwardly, the member (50) is pushed upwardly and the springs (38) and (44) are compressed. When the member (50) engages the cam surface (52) the member (50) is pushed to the right and when it has been pushed to the right far enough for the member (50) to slip off of the shoulder (53) on the rod (39), the members (50) and (40) are returned to the positions shown in Fig. 4 by the spring (44). This disconnects the terminals (48) and (49) whereupon the switch (57) is opened by a spring or by gravity in any well-known manner and the coil (26) becomes de-energized. The spring (23) then rotates member (19) and moves the pawl (17) away from the ratchet (16), thus permitting the operator to separate the electrodes. The parts are so adjusted that the automatic switch (8) controls the welding circuit in such a manner that the welding cycle is completed before the magnet (26) releases the pawl from the ratchet.

While I have illustrated in the drawings a pawl and ratchet for controlling the movement of the contacts, I desire it to be understood that any form of connection may be used which will permit the movement of the electrodes toward each other but which will prevent the movement of the electrodes away from each other until certain predetermined operations have been completed. The size of the teeth on the ratchet wheel as shown are not intended to represent the actual size but are merely illustrative of some form of tooth, it being understood that with different kinds of work the teeth on the ratch wheel will be of different sizes. It is apparent, therefore, that any form of device of the pawl and ratchet type may be used and is within the scope of my invention.

My invention has many advantages, among which may be mentioned that the essential operations may be predetermined and the carrying out of such operations is placed beyond the control of the operator, and the human element, therefore, eliminated; the arrangement permits the electrodes to be moved toward each other under all conditions, but prevents their movement away from each other under certain pre-determined conditions; the electrodes may be moved in either direction for adjustment so long as the welding circuit is not energized; by the arrangement described, the work produced by my machine is entirely uniform, and one of the chief defects of spot welding, to wit, burning of the metal, is eliminated, and the essential operation of good welding, to wit, the application of the final pressure to set the weld, is guaranteed. Many other advantages will be apparent to those skilled in the art.

While I have shown and described in great detail one form of apparatus embodying my invention, I desire it to be understood that many changes may be made in the arrangement without departing from the spirit of my invention.

I claim:

1. In a spot welding system the combination of welding contacts, resilient mechanical means for bringing said contacts into welding relation with the work and means for preventing the movement of said contacts out of welding relation until the operation is completed.

2. In a spot welding system the combination of welding contacts, means for bringing said contacts into welding relation with the work, an automatic switch for applying current to said contacts for pre-determined operations, said switch including minimum pressure determining means and means for preventing the separation of said contacts from the work until said operations have been completed.

3. In a spot welding system the combination of welding contacts, means for bringing said contacts into welding relation with the work, resilient mechanical means holding the contacts in relation to the work during the welding and means dependent upon the welding circuit for preventing the separation of the contacts from the work.

4. In a spot welding system the combination of welding contacts, means for bringing said contacts into welding relation with the work, resilient mechanical means holding the contacts in relation to the work during the welding and means operative upon the energization of the welding circuit for preventing the separation of the said contacts from the work until the completion of predetermined operations.

5. In welding apparatus the combination of contact operating means, a pawl and a ratchet member adapted to govern said means, and magnetic means for rendering said pawl and ratchet member operative or inoperative with respect to said contact operating means.

6. In welding apparatus the combination of contact operating means, a pawl and a ratchet member adapted to govern said means, and a magnet operatively connected with the welding circuit for operatively connecting or disconnecting the said contact operating means and said pawl and ratchet member.

7. In spot welding apparatus the combination of contact operating means, a rack and pinion means connected with said operating means, a pawl and a ratchet member adapted to govern said rack and pinion means and a magnetic member for operatively connecting or disconnecting the pawl and ratchet and said rack and pinion.

8. In spot welding apparatus the combination of contact operating means, a rack and pinion means connected with said operating means, a pawl and a ratchet member adapted to govern said rack and pinion means, and a magnet for operatively connecting or disconnecting the pawl and ratchet and said rack and pinion.

9. In spot welding apparatus the combination of contact operating means, a rack and pinion means connected with said operating means, a pawl and ratchet member adapted to be connected with said rack and pinion means, means normally holding the pawl in operative position and magnetic means for placing said pawl in operative relation with said ratchet.

10. A relay for electric welding machines comprising a pawl and ratchet element and magnetically controlled means for rendering the pawl and ratchet operative or inoperative.

11. A relay for electric welding machines comprising two co-operative members and magnetically controlled means for rendering said two members operative or inoperative with respect to each other.

12. A relay for electric welding machines comprising a ratchet, pawl, means normally holding the pawl out of engagement with the ratchet and an electro-magnet for moving the pawl into engagement with the ratchet.

13. A relay for electric welding machines comprising a ratchet, a pawl, means normally rendering the pawl and ratchet relation ineffective and an electro-magnet for rendering said relation effective.

14. A relay for electric welding machines comprising a ratchet, a spring-actuated pawl, a pivoted member carrying said pawl, a spring normally holding said member in a position to remove the pawl from the ratchet and magnetic means for rotating said member to allow the pawl to engage the ratchet.

15. In a spot welding system, the combination of a movable contact, means for moving the same to welding position, means independent of the welding current for applying a predetermined minimum pressure between the contact and work during the welding and means for preventing the raising of said contact until the weld is completed.

16. In a spot welding system, the combination of welding contacts, means for causing said contacts to approach and recede from each other, said means including a spring pressure means, and means whereby said contacts may always approach each other, but preventing the separation of said contacts until the weld is completed.

17. In a spot welding system, the combination of welding contacts, means for bringing said contacts into welding relation with the work, means for applying a predetermined minimum pressure between the contacts and work during the welding, means for applying welding current to said contacts under predetermined conditions and mechanical means effective so long as the welding circuit is closed for preventing separation of said contacts from the work until after the fulfillment of said conditions.

EDMUND J. von HENKE.